United States Patent
Romano et al.

(10) Patent No.: US 7,336,606 B2
(45) Date of Patent: Feb. 26, 2008

(54) CIRCULAR LINK LIST SCHEDULING

(75) Inventors: David Romano, Cumberland, RI (US); Gilbert M. Wolrich, Framingham, MA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 10/641,324

(22) Filed: Aug. 14, 2003

(65) Prior Publication Data

US 2005/0038793 A1 Feb. 17, 2005

(51) Int. Cl.
*G01R 31/08* (2006.01)
(52) U.S. Cl. .................... 370/230; 370/412
(58) Field of Classification Search .............. None
See application file for complete search history.

(56) References Cited

U.S. PATENT DOCUMENTS 6,389,019 B1 * 5/2002 Fan et al. .......... 370/395.42
6,975,638 B1 * 12/2005 Chen et al. ............. 370/412
7,006,440 B2 * 2/2006 Agrawal et al. ......... 370/235
7,042,843 B2 * 5/2006 Ni ........................ 370/231
7,136,381 B2 * 11/2006 Battle et al. ............ 370/389
2005/0036495 A1 * 2/2005 Wishneusky et al. .... 370/395.4

OTHER PUBLICATIONS

Adiletta, Matthew , et al., "Packet over SONET: Achieving 10 Gigabit/sec Packet Processing with an IXP2800", *Intel Technology Journal*, vol. 6, Issue 3, (2002), pp. 29-39.
Johnson, Erik, et al., "IXP1200 Programming", *Intel Press*, Chapter 13, (2002), pp. 291-311.

* cited by examiner

*Primary Examiner*—Edan Orgad
*Assistant Examiner*—Jung Park

(57) ABSTRACT

A scheduling mechanism to control transmission of data units, such as variable size packets or fixed size cells, to ports of a network device such as a switching fabric system. The scheduling mechanism maintains scheduling data structures, including an array storing information for available queues of ports and circular buffers representing nonempty port queues of the available port queues according to classes of service. The scheduling mechanism uses the data structures to make scheduling decisions concerning the scheduling of data units in the nonempty port queues for transmission to the ports.

22 Claims, 10 Drawing Sheets

CIRCULAR LINK LIST SCHEDULING

BACKGROUND

Typically, because of the high transmission rates required by high performance networks (e.g., 10 Gigabits per second or greater) and the high computational overhead required by traffic conditioning and transmit scheduling, these functions are implemented in dedicated hardware. Such hardware implementations cannot be easily scaled or adapted to accommodate new scheduling algorithms and quality of service standards.

Programmable software-based approaches, by nature more adaptable to changing implementations and evolving standards, are not without problems, however. At present, software implementations require that the transmit scheduler maintain queue status information (sometimes in the form of bit vectors in external memory) for transmit queues. The queue status is read by a transmit scheduler and updated by another process that processes enqueue and dequeue requests (often referred to as a queue manager). The timing of these operations can cause a race condition in which the transmit scheduler reads a queue status modified by the queue manager before the value of that queue status has been changed. Consequently, the transmit scheduler generates dequeue requests for empty queues ("false dequeuing"), resulting in lost bandwidth and wasted scheduling time slots. Moreover, the time required for the reads and writes to the queue status makes it difficult to meet line rates.

DETAILED DESCRIPTION

Figure 1:
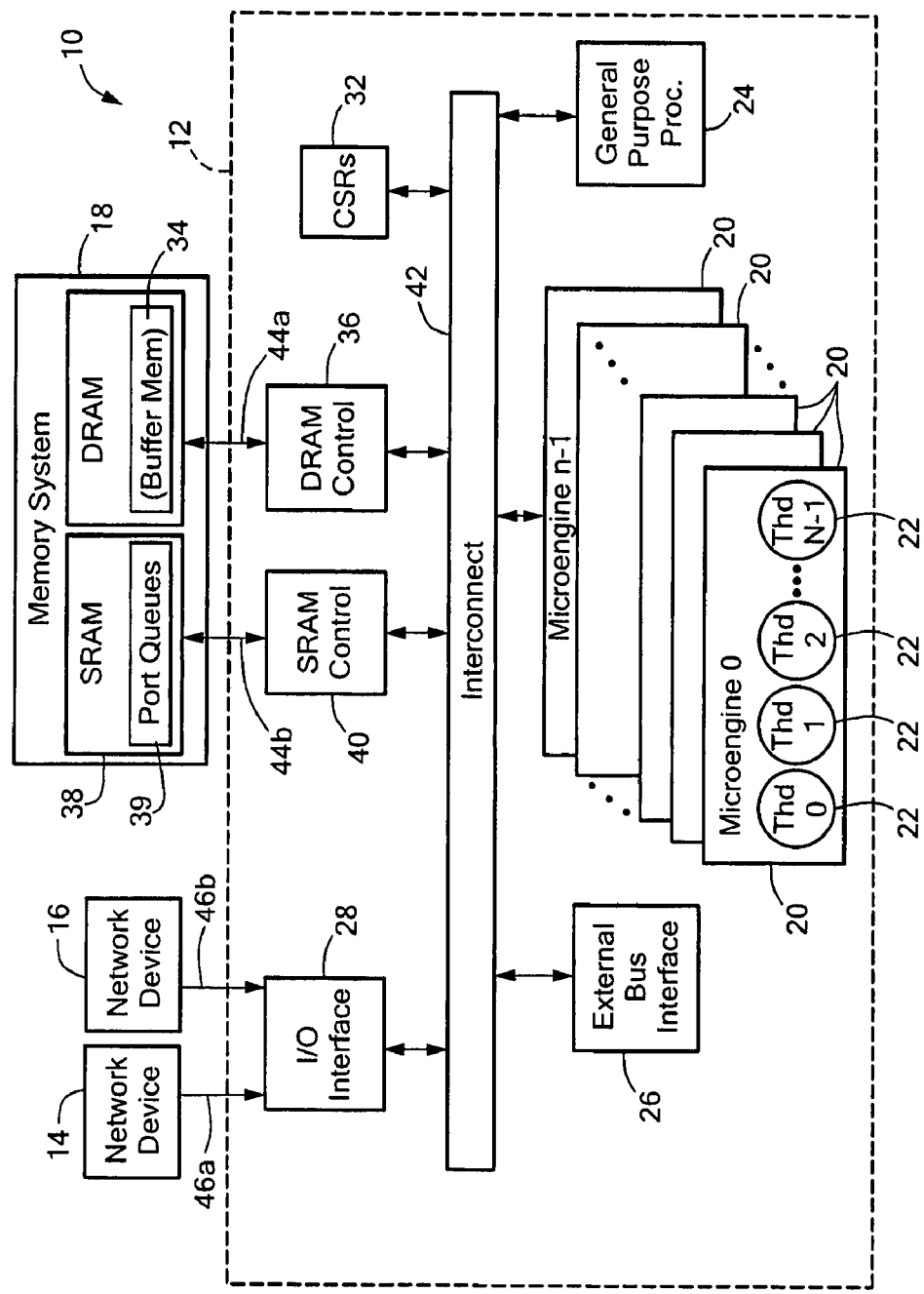
FIG. 1 is a block diagram of a communication system employing a processor having multi-threaded microengines.

Referring to FIG. 1, a communication system 10 includes a processor 12 coupled to one or more I/O devices, for example, network devices 14 and 16, as well as a memory system 18. In one embodiment, as shown in the figure, the processor 12 includes a number ("n") of multi-threaded processors or microengines (MEs) 20, each with multiple hardware-controlled program threads. Each of the microengines 20 is connected to and can communicate with adjacent microengines.

The processor 12 also includes a general purpose processor 24 that assists in loading microcode control for other resources of the processor 12 and performs other general purpose computer type functions such as handling protocols and exceptions, as well as provides support for higher layer network processing tasks that cannot be handled by the microengines.

The microengines 20 each operate with shared resources including the memory system 18, an external bus interface 26, an I/O interface 28 and control and status registers (CSRs) 32. The external bus interface 26 provides an interface to an external bus (not shown). The I/O interface 28 is responsible for controlling and interfacing the processor 12 to the network devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations.

The DRAM 34 and DRAM controller 36 are typically used for storing large volumes of data, e.g., buffer memory to store payloads from network packets. The SRAM 38 and SRAM controller 40 are used in networking applications for low latency, fast access tasks, e.g., accessing look-up tables, descriptors, free lists, and so forth. For example, and as shown, the SRAM 38 stores port (or transmit) queues 39. The elements of the port queues 39 are descriptors corresponding to packet data buffered in the DRAM 34. The microengines 20 can execute memory reference instructions to either the DRAM controller 36 or the SRAM controller 40.

The devices 14 and 16 can be any network devices capable of transmitting and/or receiving network traffic data, such as framing or Media Access Control (MAC) devices, e.g., for connecting to 10/100BaseT Ethernet, Gigabit Ethernet, Asynchronous Transfer Mode (ATM) or other types of networks, or devices for connecting to a switch fabric. For example, in one arrangement, the network device 14 could be an Ethernet MAC device (connected to an Ethernet network, not shown) that transmits packet data to the processor 12, and device 16 could be a switch fabric system that receives processed packet data from processor 12 for transmission onto a switch fabric. In such an implementation, that is, when handling traffic to be sent to a switch fabric, the processor 12 would be acting as an ingress network processor.

Alternatively, the processor 12 could operate as an egress network processor, handling traffic that is received from a switch fabric (via network device 16) and destined for another network device such as network device 14, or network coupled to such a device. Although the processor 12 can operate in a standalone mode, supporting both traffic directions, it will be understood that, to achieve higher performance, it may be desirable to use two dedicated processors, one as an ingress processor and the other as an egress processor. The two dedicated processors would each be coupled to the devices 14 and 16. With such an arrangement, the communication system 10 may be used as a line card, such as a 10 Gbps Synchronous Optical NETwork (SONET) line card, in a high speed network forwarding device. In addition, each network device 14, 16 can include a plurality of ports to be serviced by the processor 12.

The I/O interface 28 therefore supports one or more types of interfaces, such as an interface for packet and cell transfer between a physical layer (PHY) device and a higher protocol layer (e.g., link layer), or an interface between a traffic manager and a switch fabric for ATM, Internet Protocol (IP), Ethernet and other data communications applications. Although not shown, the I/O interface 28 includes receive and transmit blocks, and each may be separately configurable for a particular interface supported by the processor 12.

Other devices, such as a host computer and/or external bus peripherals (not shown), which may be coupled to an external bus controlled by the external bus interface 26 are also serviced by the processor 12.

In general, as a network processor, the processor 12 can interface to any type of communication device or interface that receives/sends large amounts of data. The processor 12 functioning as a network processor could receive units of data from a network device like network device 14 and process those units of data in a parallel manner. The unit of data could include an entire network packet (e.g., Ethernet packet) or a portion of such a packet, e.g., a cell such as a Common Switch Interface (or "CSIX") cell or ATM cell, or packet segment. Other data units are contemplated as well. Hereafter, the units of information operated on by the microengines 20, in particular, during transmit scheduling, will be referred to generally as "data units" or "data".

Each of the functional units of the processor 12 is coupled to an interconnect 42. Memory busses 44*a*, 44*b* couple the memory controllers 36 and 40, respectively, to respective memory units DRAM 34 and SRAM 38 of the memory system 18. The I/O Interface 28 is coupled to the devices 14 and 16 via separate I/O bus lines 46*a* and 46*b*, respectively.

Figure 2A:
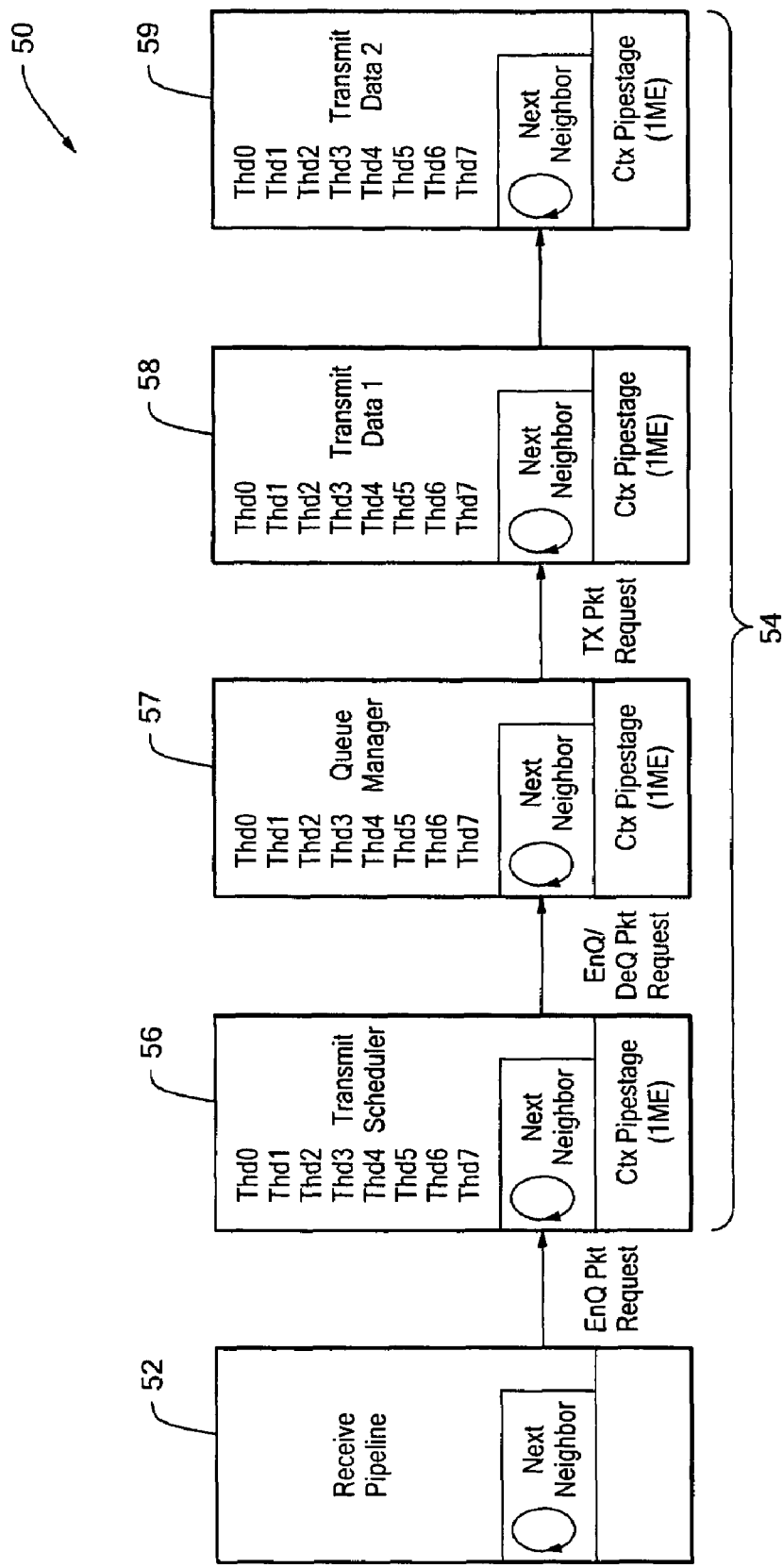
FIG. 2A is a depiction of the microengines as a pipeline of ingress processing stages, including a receive pipeline and a transmit pipeline, the transmit pipeline including a transmit scheduler.

Referring to FIG. 2A, an exemplary ME task assignment for a software processing pipeline model 50 of the processor 12 is shown. In this application example, the processor 12 supports two pipelines, a receive (RX) pipeline 52 and a transmit (TX) pipeline 54.

The RX pipeline 52 begins with data arriving in a receive block of the I/O interface 28 and ends with the enqueuing of data for transmission in the port (or transmit) queues 39 (from FIG. 1)). The TX pipeline stages include a TX scheduler 56, a queue manager (QM) 57 and one or more transmit data stages (shown here as two stages) 58 and 59. Other functions, such as statistical processing, may be performed in the TX pipeline 54 as well.

The QM 57 is responsible for performing enqueue and dequeue operations on the port queues for data units, as will be described in further detail below. The RX pipeline 52 parses headers and performs lookups based on the header information. Once the data unit has been processed, it is either sent as an exception to be further processed by the core 24, or stored in the DRAM 34 and enqueued for transmit by placing a descriptor for it in the port queue associated with the port and class indicated by the header/lookup.

The TX pipeline 54 schedules data units for processing by the transmit data stages (that is, stages 58 and 59), which send the data unit to the appropriate port.

The RX pipeline 52 includes stages for processing and classifying data units received by one of the network devices 14, 16 (FIG. 1), e.g., a physical layer device 14. Part of that processing/classification or conditioning may be associating each unit with a flow that requires shaping according to a Service Level Agreement (SLA) and associating the unit with the appropriate class. The processor 12 is configured to support a number ("K") of different classes. The classes may correspond to different priority levels or, in the case of the Internet Protocol (IP), differentiated services. Various Internet Requests for Comment (RFCs) describe differentiated services for IP, for example, RFC 2474 (December 1998), RFC 2475 (December 1998), RFC 2597 (June 1999), RFC 2598 (June 1999) and RFC 2697 (September 1999). In the embodiment described herein, the number of classes K is four to support four priority levels or classes, e.g., the classes of the Assured Forwarding (AF) differentiated services codepoint.

Based on the traffic conditioning of the RX pipeline, that pipeline issues an enqueue request specifying the port queue to which the arriving data unit is to be directed. In the illustrated pipeline 50, the transmit scheduler 56 receives each enqueue request containing enqueue state (which provides such information as, for example, port (/class) queue identifier, as already mentioned, and queue count, e.g., total number of cells or other data units in the queue) from the RX pipeline 52 and forwards the enqueue request to the QM 57. The transmit scheduler 56 also generates dequeue requests and sends the dequeue requests to the QM 57. The dequeue requests specify the port queue from which a packet is to be removed for transmittal to a destination via one of the network devices, 14, 16, e.g., a switch fabric device 16.

An enqueue operation adds information that arrived in a data unit such as a packet to one of the port queues and updates the queue descriptor for that queue. A dequeue operation removes information from one of the port queues and updates the corresponding queue descriptor. The SRAM controller 40 performs the actual linked list operation for enqueue or dequeue. After a dequeue operation, the QM 57 passes a transmit request to the TX data stage 58.

Figure 2B:
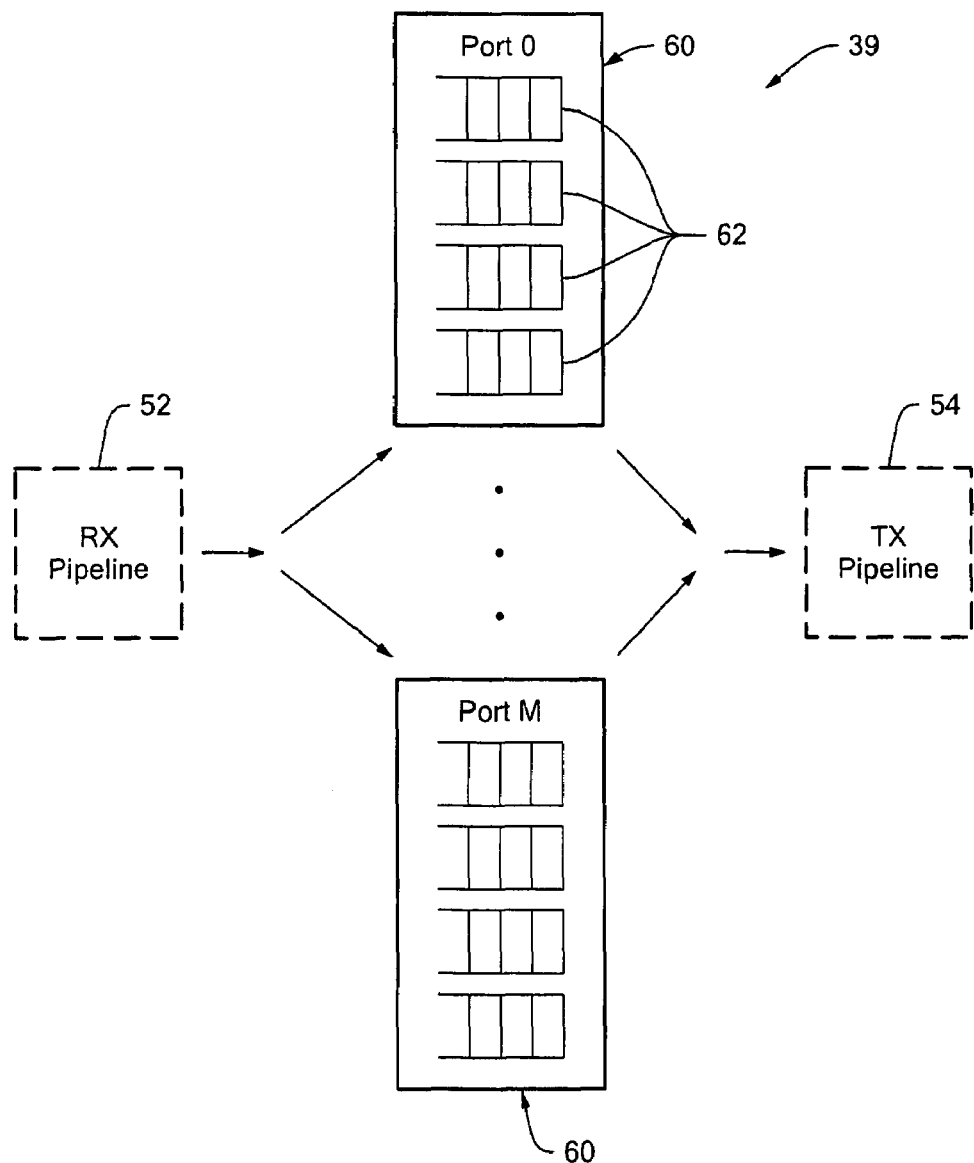
FIG. 2B is a depiction of port queues stored in a Static Random Access Memory (SRAM) of the communication system and operated on by the receive and transmit pipelines.

FIG. 2B shows, for "M" ports 60, "M×K" queues. That is, each port has at least one queue 62 for each of the K service classes supported by the system 10. Thus, each queue 62 corresponds to a unique class/port combination. As noted earlier, the port queues 39 reside in external memory (SRAM 38). Each port queue 62 includes a linked list of elements, each of which has a pointer with the address of the next element in the queue. Each port queue element also includes a pointer that points to information that is stored elsewhere and that the element represents (e.g., packet buffers in DRAM 34).

Figure 3:
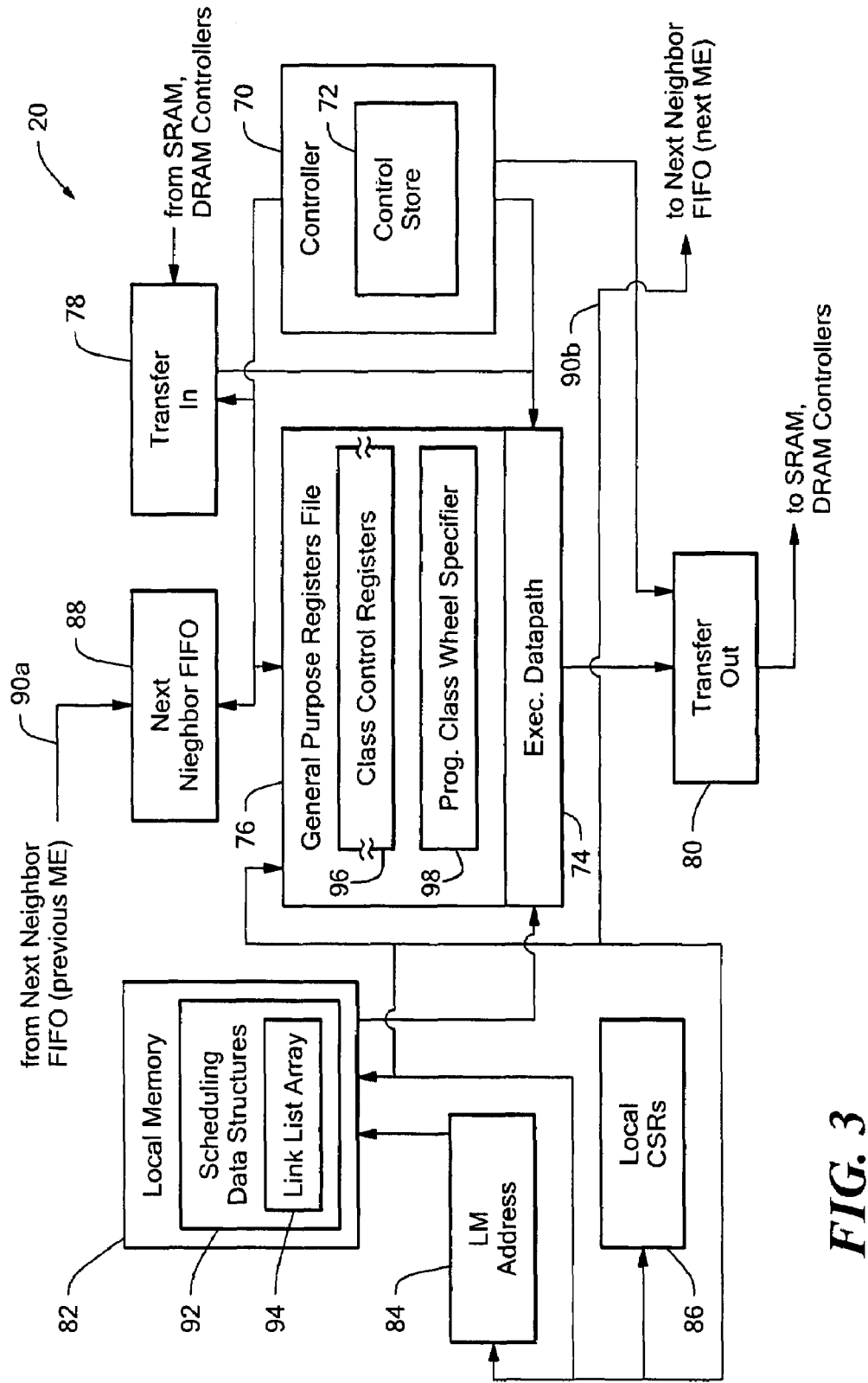
FIG. 3 is a block diagram of an exemplary microengine (ME), which is programmed to perform as a transmit scheduler.

Referring to FIG. 3, an exemplary one of the microengines 20 which is configurable to execute a microprogram defining the transmit scheduler 56 on one or more of its threads is shown. In general, microengine (ME) 20 includes a controller 70 that has a control store 72 for storing a microprogram. The microprogram is loadable by the processor 24. The microengine 20 also includes an execution datapath 74 and at least one general purpose register (GPR) file 76 that are coupled to the controller 70. The datapath 74 can include one ore more datapath elements, e.g., an ALU, a multiplier and a Content Addressable Memory (CAM), not shown. The GPR file 76 provides operands to the various datapath processing elements. The GPR file includes various registers which can be used by threads during execution.

The ME 20 further includes a read transfer register file 78 and a write transfer register file 80. The write transfer register file 80 stores data to be written to a resource external to the ME (for example, the DRAM memory or SRAM memory). The read transfer register file 78 is used to store return data from a resource external to the ME 20. Subsequent to or concurrent with the data arrival, an event signal from the respective shared resource, e.g., memory controllers 36, 40, or core 24, can be provided to alert the thread that the data is available or has been sent. Both of the transfer register files are connected to the datapath 74, as well as the controller 70.

Also included in the ME 20 is a local memory 82. The local memory 82 is addressed by local memory (LM) address registers 84, and which supplies operands to the datapath 74. The local memory 82 receives results from the datapath 74 as a destination.

The ME 20 also includes local control and status registers (CSRs) 86, coupled to the transfer registers, for storing local inter-thread and global event signaling information and other information. Also included are next neighbor (NN) registers (shown as a FIFO) 88, coupled to the controller 70 and the execution datapath 74, for storing information received from a previous neighbor ME in pipeline processing over a NN input signal 90$a$, or from the same ME, as controlled by information in the local CSRs 86. An NN output signal 90$b$ to the NN FIFO 88 in a next ME in the processing pipeline 50 can be provided under the control of the local CSRs 86. In the scheduling context, the NN registers and signals are used to pass enqueue and dequeue requests between pipelines and between pipeline stages. For example, the RX pipeline 52 sends enqueue requests to the next stage, the scheduler 56, in the TX pipeline 54, via the NN FIFO of the scheduler ME. The scheduler 56 forwards the enqueue requests and sends dequeue requests to the QM 57 via the NN FIFO of the QM ME.

In the illustrated example, the ME 20 is configured to support execution of the scheduler 56 on one or more of its threads. Towards that purpose, the ME 20 includes a number of scheduler data structures used by the scheduler in support of dequeue operations. In particular, the local memory 82 stores scheduling-related data structures 92 including an array 94 (shown as a link list array 94). Also, the GPR file 76 includes control data structures for accessing the array. The control data structures include a set of class control registers 96 and a programmable class wheel specifier 98 (shown as a programmable class wheel register 98). The scheduler 56 examines enqueue state of data units as they are enqueued, and makes scheduling decisions utilizing the link list array 94, class control registers 96 and programmable class wheel specifier 98. Through the use of these structures, scheduling is simplified to a process of withdrawing entries from link lists in the link list array 94, as will be described.

In one embodiment, the scheduler 56 schedules data units for transmission into a switch fabric supporting multiple line cards. Each line card may have one or more ports, and each port supports one or more class types. In one exemplary implementation, as will be described with reference to FIGS. 4-11, the number of line cards is sixteen, each line card includes eight ports (for a total of 128 ports) and each port on a line card supports four classes. It will be appreciated that the data structures can be scaled appropriately to support any number of ports and classes, and the classes may be any scheduling-related classification or level. The scheduler 56 uses the data structures 94, 96 and 98 (of FIG. 3) to implement a hierarchical scheduling mechanism.

Figure 4:
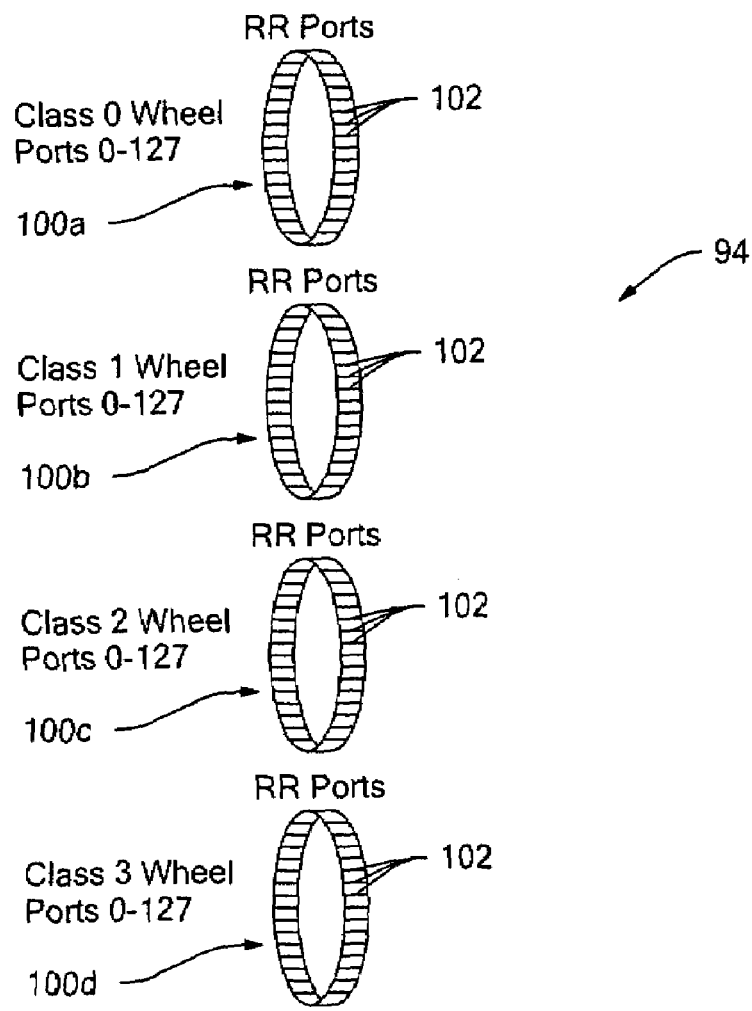
FIG. 4 is a depiction of exemplary linked list "class wheels" maintained in the ME of FIG. 3.

Referring now to FIG. 4, further details of the link list array 94 are shown. For each of the classes, there is a circular data structure (or "class wheel") 100 of M entries 102, each entry 102 corresponding to a different port. In the illustrated embodiment, the circular data structure is in the form of a single link list or buffer, but other types of data structures, e.g., queues or rings, may be used. In the case of K=4 classes, the link list array 94 includes class wheels 100$a$, 100$b$, 100$c$ and 100$d$, corresponding to class 0, class 1, class 2 and class 3, respectively. Each class wheel 100 has 128 entries 102 to support 128 ports. The scheduler 56 uses the class wheels 100 to determine the next eligible schedule for each class. Each class wheel 100 is serviced in a Round Robin (RR) manner.

Figure 5:
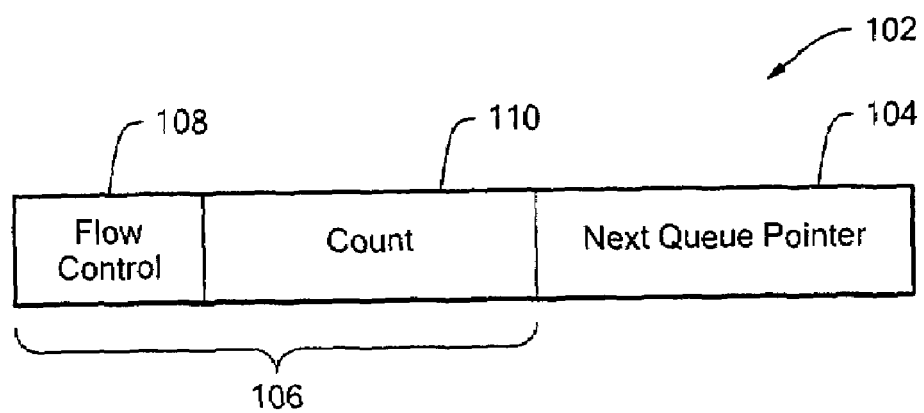
FIG. 5 is a depiction of an exemplary field format of a queue entry in each class wheel (of FIG. 4) to maintain a schedule for a particular port/class combination.

Referring now to FIG. 5, an example format of the class wheel entry (or queue entry) 102 is shown. As discussed above, each entry is associated with a different combination of class and port queue. It should be noted that the class wheels are lists of only active port queues, thus each entry 102 represents a queue ready for dequeue. Each queue entry 102 stores a pointer to the next queue entry ("next queue pointer") 104 in the same class wheel. Thus, the next active port queue is selected in a Round-Robin fashion by walking the list. The queue entry 102 further includes queue state 106, including flow control state 108 (indicating if flow control is asserted) and a count 110 of data units stored in the queue to which the queue entry corresponds. The flow control state 108 is maintained for each queue to avoid the generation of invalid de-queues. The scheduler 56 uses count information (determined from the enqueue state provided in enqueue requests) to maintain the count 110 for each queue. Thus, for example, when a new data unit such as a cell is enqueued on a particular port queue, the existing count 110 in the queue state 106 is examined and incremented. Likewise, when a data unit is dequeued, the count 110 in the queue state 106 is decremented. In a 32-bit implementation, the next queue pointers are 8-bits wide, the queue count is 23-bits wide and flow control is a single bit indicator.

Figure 6:
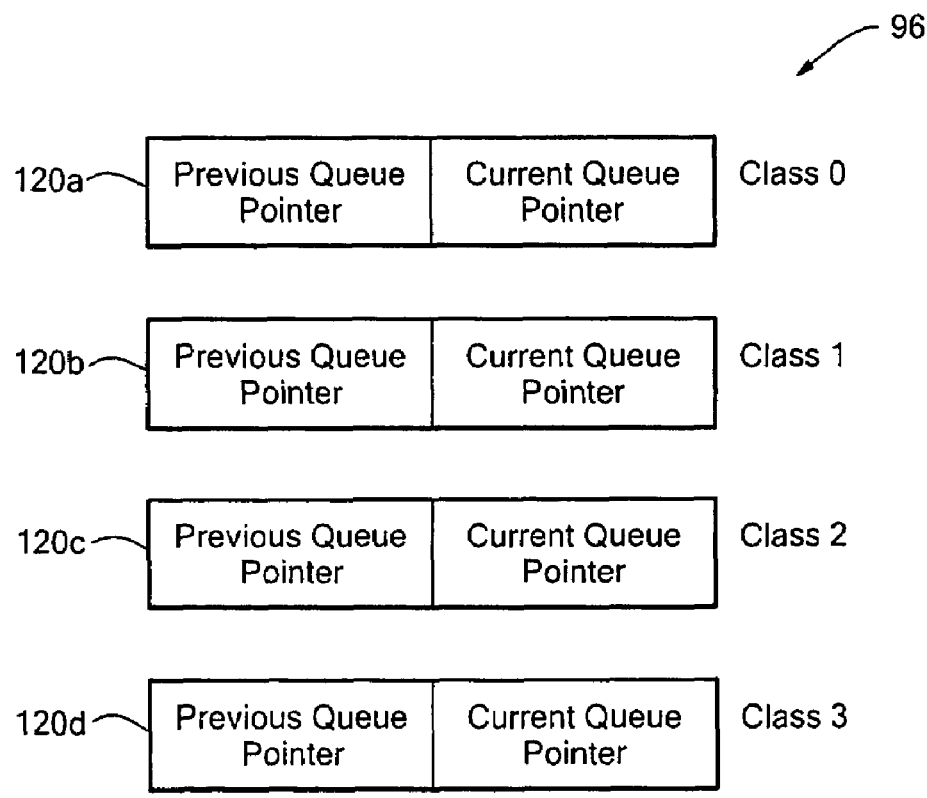
FIG. 6 is a depiction of ME class control registers used to select a class wheel and class wheel entry during scheduling.

Pointers to each class wheel 100 are stored separately in the class control registers 96, as shown in FIG. 6. The class control registers 96 include a register for each class, that is, in the case of four classes, registers 120$a$, 120$b$, 120$c$ and 102$d$ for class 0, class 1, class 2 and class 3, respectively. Each register 120 stores a previous queue pointer 122 and a current queue pointer 124. Thus, for a given class wheel, pointer 124 points to the current queue entry and pointer 122 points to the previous queue entry. In a 32-bit word implementation, each of the points is 16-bits wide.

Figure 7:
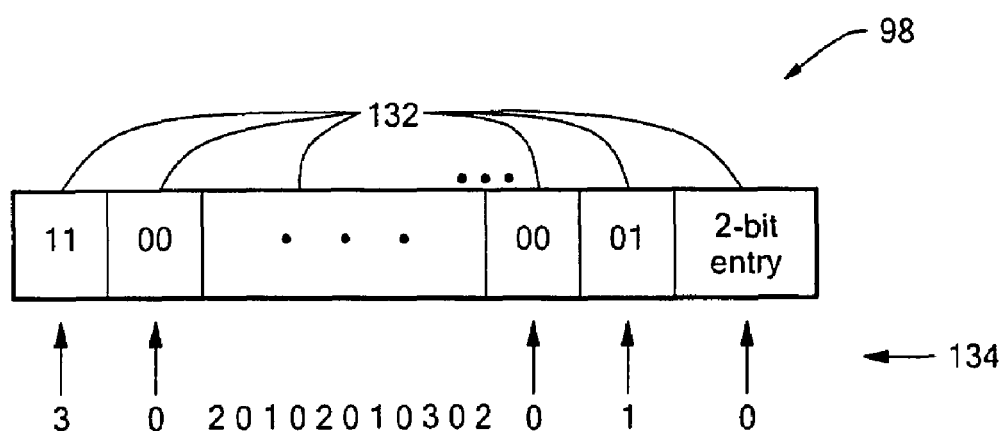
FIG. 7 is a depiction of an ME programmable class wheel specifier used to select a class control register during scheduling.

Referring to FIG. 7, an embodiment of the programmable class wheel specifier 98 (hereinafter, simply "specifier" 98) is shown. The specifier 98 is used by the scheduler 56 to select a class, more particularly, a class wheel via a corresponding class control register, for service during a given scheduling interval. In one embodiment, the specifier 98 is a register with multiple two-bit entries 132. In the illustrated example, the register is a 32-bit register with sixteen entries 132. Each entry 132 serves to store a binary representation of any one of the four class numbers. The bit vector 98, once configured by a user with a desired sequence of class numbers, for example, sequence 134 ('0, 1, 0, 2, 0, 3, 0 1, 0, 2, 0, 1, 0, 2, 0, 3'), is rotated (to the right) by 2 bits and the two right-most bits are read by the scheduler for each new class selection. The sequence may be chosen to apply some degree of weighting to the classes, for example, to prioritize a certain class or classes (such as class 0 in the example sequence), while ensuring that all classes are serviced in a fair manner. The specifier 98 thus provides an anti-starvation mechanism, which ensures fairness with some degree of programmability, in a single register for efficient queue prioritization. The specifier 98 employs a work-conserving algorithm, that is, it searches for work to perform in each scheduling interval. If no work is found on a particular class wheel, the search moves to the next class wheel.

Figure 8:
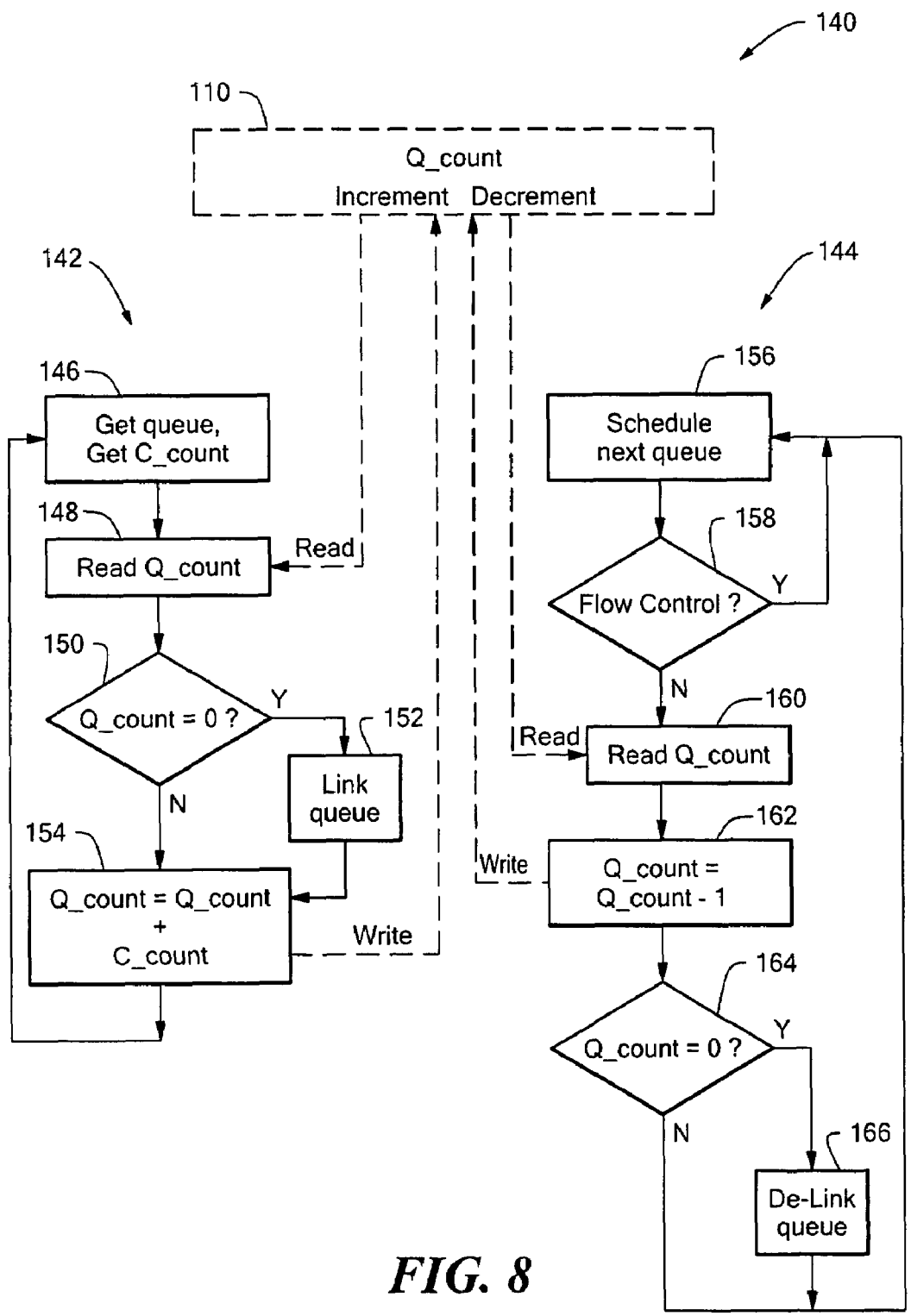
FIG. 8 is a flow diagram illustrating an exemplary process, including enqueue and dequeue processes, of the transmit scheduler.
Figure 9:
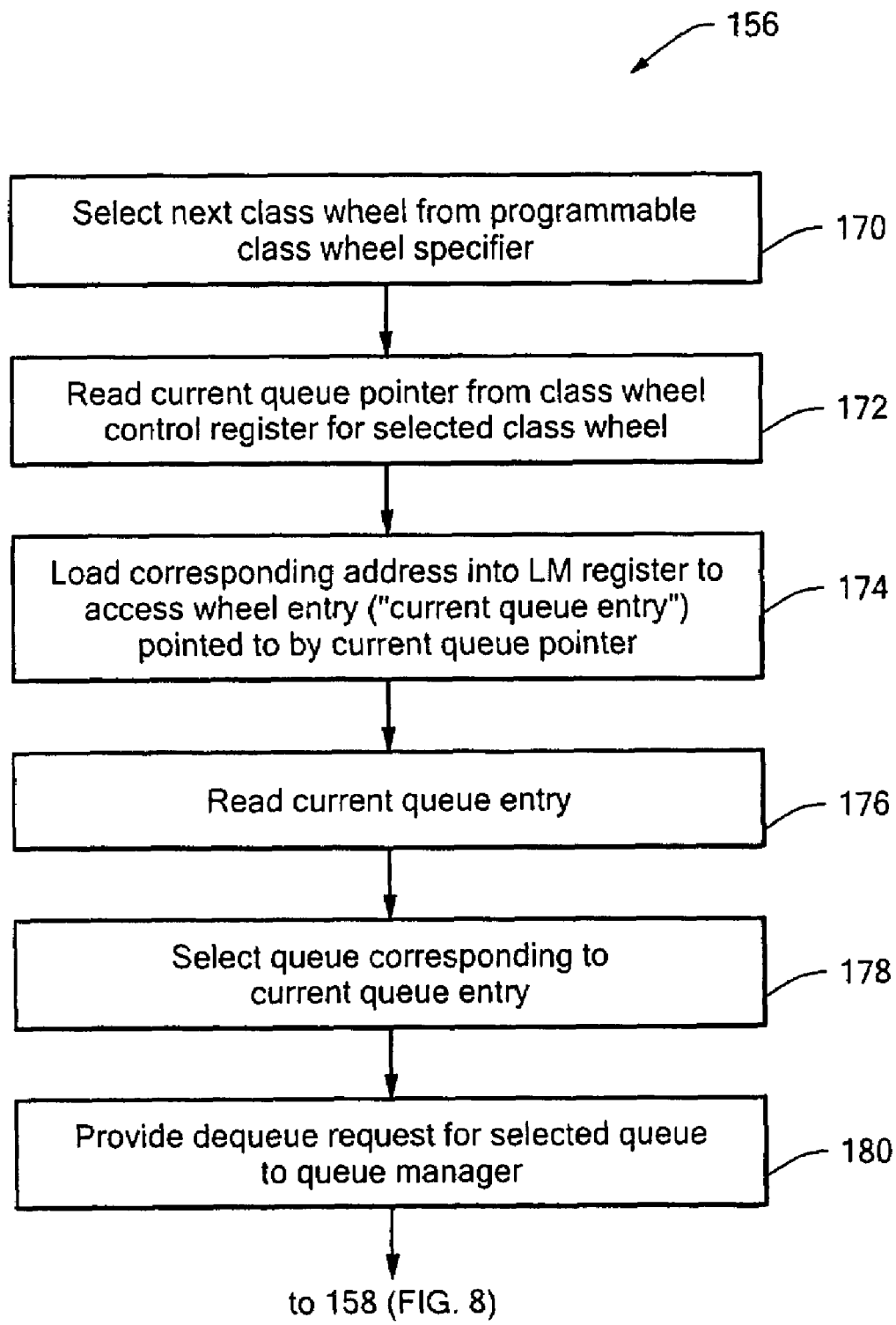
FIG. 9 is a flow diagram illustrating an exemplary scheduling portion of the dequeue process of FIG. 8.

Referring to FIGS. 8-9, an exemplary scheduling process 140 performed by the scheduler 56 is shown. This processing enables the scheduler 56 to track the status of queues (empty or non-empty) and issue dequeue requests (to the QM 57).

Turning to FIG. 8, the scheduling process 140 is divided into two parts, an enqueue process 142 and a dequeue process 144. As indicated in the figure, these processes share access to the count ('Q_count') 110, that is, the count maintained in the class wheels for each queue involved in an enqueue process and subsequent dequeue process. These processes 142, 144 update the count for each such queue in response to enqueue and dequeue requests directed to the queue to prevent scheduling from empty queues. The enqueue process 142 obtains 146 the queue number and enqueue state count ('C_count') associated with an enqueue request by reading the enqueue state of the enqueue request. It also reads 148 the current value of 'Q_count' from the field 110 in the queue state of the class wheel for the queue. The enqueue process 142 determines 150 if Q_count is equal to zero. If so, the enqueue process 142 links the queue to the link list of the class wheel for this queue as the queue is transitioning from an empty to a non-empty (or active) state. Otherwise, or once the linking is complete, the enqueue process 142 updates 154 the value of Q_count by incrementing it by the amount of C_count.

The dequeue process 144 schedules 156 a next eligible (non-empty) queue. After the dequeue process 144 verifies that flow control is not active (FC bit not asserted), the process 144 reads 160 Q_count and updates 160 that count by decrementing it by one. The process 144 determines 162 if the queue has become empty (count=0). If the queue is now empty, the process 144 de-links 166 the queue by removing it from the active list.

Referring now to FIG. 9, details of the scheduling processing 156 by the enqueue process 144 are shown. The enqueue process 144 selects 170 a next class wheel from the specifier (which was shown in FIG. 7). The process 144 reads 172 the current queue pointer from the class control register for the selected class wheel. The process loads 174 the corresponding address into the LM address register and accesses the wheel entry ("current queue entry") pointed to by the current queue pointer. The process 144 reads 176 the current queue entry and selects the queue corresponding to the current queue entry for dequeue. The process provides 180 a dequeue request for the selected queue to the QM 57. It will be appreciated that a portion of processing 156 may be repeated to schedule multiple queues by following the next queue pointer in each current queue entry (at 176).

Scheduling is thus simplified to a process of withdrawing scheduling entries from a class wheel. Because the scheduler 56 maintains a queue count, no false dequeuing can occur. Also, having a link list array that maintains lists of active queues (queues for which the count is greater than zero) ensures that a queue schedule is always available in each scheduling interval.

The scheduler reads the class control register and writes the address stored in the current queue pointer field. Each queue is mapped to an address in memory, i.e., Q0 mapped to address 0, Q1 mapped to address 4, Q2 mapped to address 8 and so on. Each class wheel entry contains the next queue pointer for its class. The next queue pointer links the current active queue entry to the next queue entry. By following the links the scheduler thread can efficiently find each active queue in the class.

Figure 10:
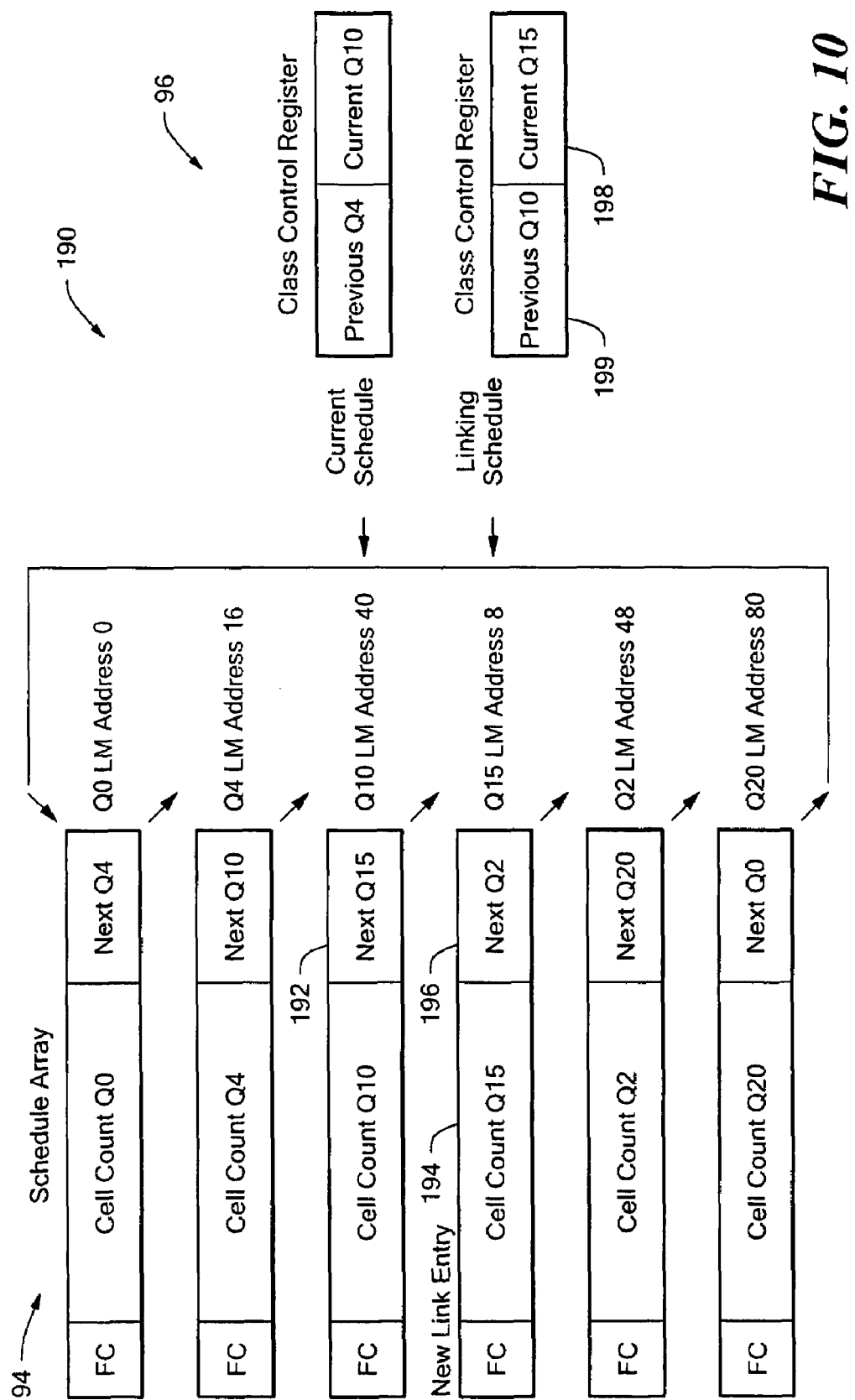
FIG. 10 is a depiction of an exemplary linking operation performed during the enqueue process of FIG. 8.
Figure 11:
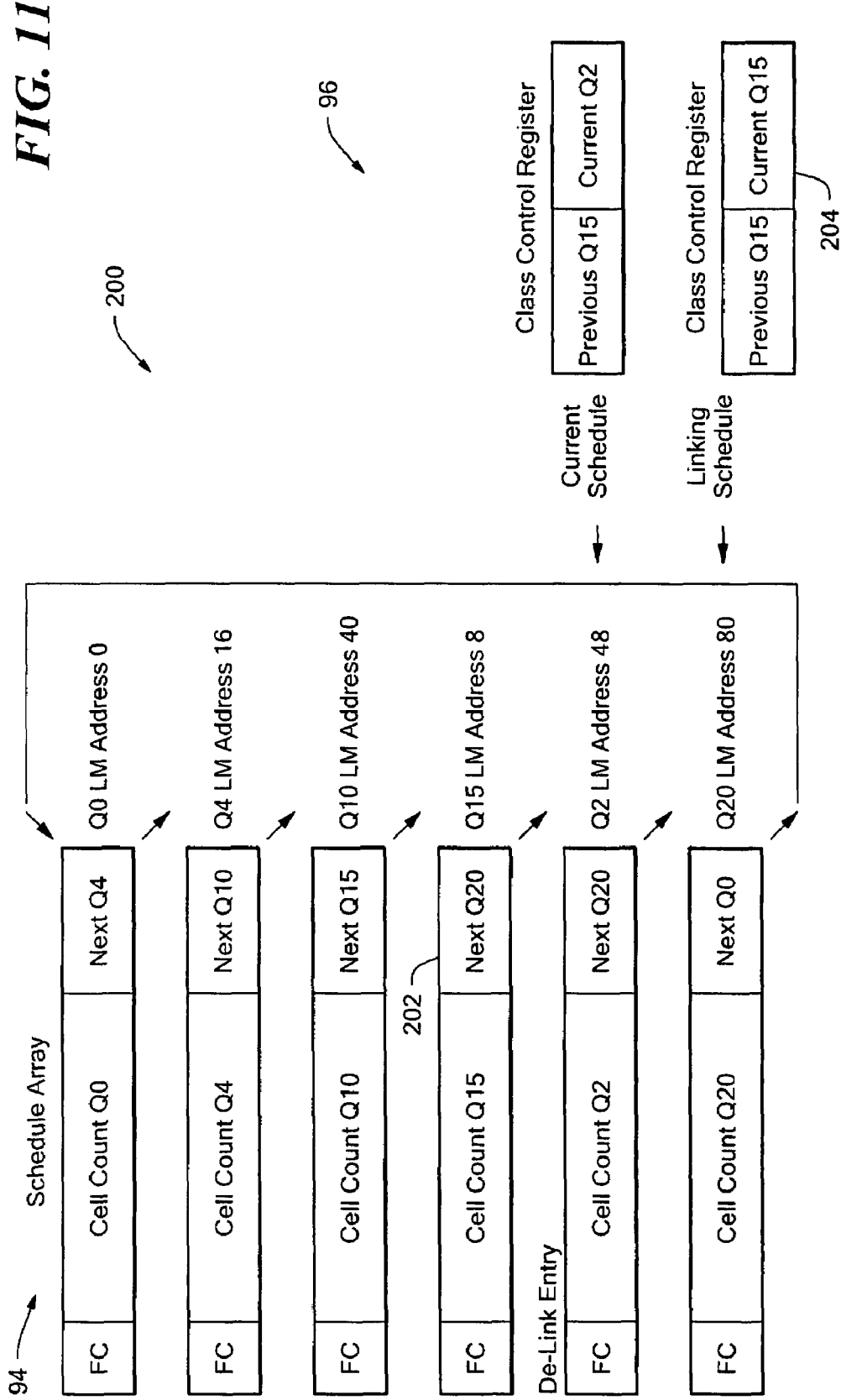
FIG. 11 is a depiction of an exemplary de-linking operation performed during the dequeuing process of FIG. 8.

As was described with reference to the enqueue process 142 (FIG. 8), a queue that transitions from an empty queue (count=0) to an active queue must be linked onto the link list of the appropriate class wheel. An example of a linking operation for a class wheel of five existing entries is illustrated in FIG. 10. In this example, the new link entry corresponds to queue Q15 and is being inserted into the list between entries corresponding to queues Q10 and Q2. Also, in this example, the data unit is assumed to be a cell, so the count is shown as a cell count. The scheduler 56 reads the class control register for Q10 and writes the memory with the address stored in the previous queue pointer field (that is, Q4). The next queue field of the next schedule array entry (Q10) is updated with the new queue address, Q15. The updated field is indicated as updated field 192. The count field 110 (shown here as a cell count field, as noted earlier) of the new link entry Q15 is written with the count passed in the enqueue state (updated field 194) and the next queue pointer field 104 is loaded with the pointer from the previous link entry, that is, the pointer for Q2 (updated field 196). In the class control register 96, the current queue pointer, pointing to Q10, is updated to point to the new link Q15 (updated field 198) and the previous queue pointer, pointing to Q4, is changed to point to the queue of the previous queue entry, Q10 (updated field 199).

Also, each time a queue is scheduled the count contained in the array entry for that queue is decremented by one. When the count is equal to zero, the queue has become inactive and must be de-linked. Continuing with the running example from FIG. 10, and referring now to FIG. 11, the de-linking operation begins by reading the class control register 96 to find the current schedule and loading the LM address CSR with the address stored in the previous queue pointer field, in this case, Q15. The next queue field of the schedule array entry for Q15 is updated with the next queue pointer, the pointer for Q20 (updated field 202). The current queue pointer in the class control register is updated to point to the previous link, that is, Q15 (updated field 204).

Other embodiments are within the scope of the following claims. For example, although the hierarchical scheduling mechanism is described in the context of an application that uses four classes and 128 port queues per class, it will be appreciated that the programmable nature of the scheduling mechanism allows it to scale in both the number of ports supported and the number of classes per port supported. Also, although the illustrated embodiment of processor 12 includes multi-threaded processors (MEs 20), the scheduling mechanism can be extended to include processors without multi-threading capability.

What is claimed is:

1. A method to maintain data structures for scheduling, the data structures comprising an array comprising information for available queues of ports and circular buffers representing nonempty port queues of the available port queues according to classes of service, each circular buffer comprising a link list, and control structures to access the array comprising a class control register associated with each link list to maintain links for such link list, the method comprising:

maintaining data structures for scheduling, scheduling data units in the nonempty port queues for transmission to the ports by using the data structures, wherein maintaining data structures comprises maintaining control structures comprising a specifier usable to select one of the link lists via the associated class control register, the specifier comprises a register of fields and the fields receive data corresponding to different classes in the classes of service.

2. The method of claim 1 wherein each circular buffer comprises entries and each entry corresponds to one of the nonempty port queues for the circular buffer.

3. The method of claim 2 wherein the information comprises queue state information for the available port queues including the nonempty port queues, and each entry includes the queue state information for the nonempty port queue to which such entry corresponds.

4. The method of claim 3 wherein the queue state information comprises a count of stored data units.

5. The method of claim 3 wherein each entry further comprises a pointer to a next entry in the link list.

6. The method of claim 3 wherein scheduling data units comprises:
updating counts in the queue state information of the available port queues when either enqueuing or dequeuing requests are generated for any of the port queues.

7. The method of claim 6 wherein scheduling data units further comprises reading the counts to detect changes in queue state information.

8. The method of claim 7 wherein scheduling data units further comprises:
performing a linking operation to add a new entry to one of the link lists when a change in the queue state information for one of the available port queues indicates that such port queue has transitioned from empty to nonempty; and
performing a de-linking operation to remove an entry from one of the link lists when a change in the queue state information of the nonempty port queue to which such entry corresponds indicates that such nonempty port queue has transitioned from a nonempty to empty.

9. The method of claim 7 wherein the available ports comprise ports of a switching fabric system.

10. The method of claim 1 wherein the specifier is programmable.

11. The method of claim 1 wherein the data comprises class numbers and the specifier, once programmed, stores a sequence of the class numbers to determine the order in which the link lists are selected for scheduling.

12. The method of claim 11 wherein using scheduling data units further comprises:
selecting a class control register by reading a class number from the specifier;
using one of the links stored in the selected class control register to access a current entry in one of the link lists; and
generating a dequeue request for the nonempty port queue to which the current entry corresponds.

13. The method of claim 12 wherein scheduling data units further comprises:
scheduling additional nonempty port queues associated with the selected link list by traversing the selected link list.

14. The method of claim 1 wherein the classes of service comprise differentiated services classes.

15. An article comprising: a storage medium having stored thereon instructions that when executed by a computer result in the following:
maintaining data structures for scheduling, the data structures comprising:
an array comprising:
information for available queues of ports; and
circular buffers representing nonempty port queues of the available port queues according to classes of service, each circular buffer comprising a link list; and
control structures to access the array comprising:
a class control register associated with each link list to maintain links for such link list; and
a specifier usable to select one of the link lists using the associated class control register, the specifier comprises a register of fields and the fields receive data corresponding to different classes in the classes of service; and
using the data structures to schedule data units in the nonempty port queues for transmission to the ports.

16. The article of claim 15 wherein each circular buffer comprises entries, and each entry corresponds to one of the nonempty port queues for the circular buffer.

17. Processing circuitry comprising:
multiple processors, at least one of which is configurable as a scheduler; data structures residing in and maintained by the scheduler, the data structures comprising:
an array comprising:
information for the available queues of ports; and
circular buffers representing nonempty port queues of the available port queues, according to classes of service, each circular buffer comprising a link list; and
control structures to access the array comprising:
a class control register associated with each link list to maintain links for such link list; and
a specifier usable to select one of the link lists using the associated class control register, the specifier comprises a register of fields and the fields receive data corresponding to different classes in the classes of service; and
wherein the scheduler is operable to use the data structures to schedule data units in the nonempty port queues for transmission to the ports.

18. The processing circuitry of claim 17 wherein each circular buffer comprises entries, and each entry corresponds to one of the nonempty port queues for the circular buffer.

19. The processing circuitry of claim 17 wherein each of the multiple processors has multiple threads of execution and at least one of the multiple execution threads on the processor configurable as the scheduler is usable to perform a scheduling task.

20. The processing circuitry of claim 17 wherein the data corresponding to different classes in the classes of service comprises class numbers.

21. A network forwarding device comprising:
at least one line card for forwarding networking data to ports of a switching fabric; the at least one line card comprising a network processor comprising multiple multi-threaded processors, at least one of which is configurable as a scheduler;
data structures, residing in and maintained by the scheduler, for scheduling according to classes of service, the data structures comprising:

an array comprising:
  information for the available queues of ports; and
  circular buffers representing nonempty port queues of the available port queues;
control structures to access the array comprising:
a class control register associated with each link list to maintain links for such link list; and
a specifier usable to select one of the link lists using the associated class control register, the specifier comprises a register of fields and the fields receive data corresponding to different classes in the classes of service, wherein the scheduler is operable to use the data structures to schedule data units in the nonempty port queues for transmission to the ports.

22. The network forwarding device of claim 21 wherein each circular buffer is associated with a different one of the classes of service and comprises entries, each entry corresponding to one of the nonempty port queues for the circular buffer.

* * * * *

UNITED STATES PATENT AND TRADEMARK OFFICE
CERTIFICATE OF CORRECTION

| | | |
|---|---|---|
| PATENT NO. | : 7,336,606 B2 | Page 1 of 1 |
| APPLICATION NO. | : 10/641324 | |
| DATED | : February 26, 2008 | |
| INVENTOR(S) | : Romano et al. | |

It is certified that error appears in the above-identified patent and that said Letters Patent is hereby corrected as shown below:

In column 9, line 48, in Claim 12, after "wherein" delete "using".

Signed and Sealed this

Twenty-second Day of July, 2008

JON W. DUDAS
*Director of the United States Patent and Trademark Office*